(12) United States Patent
Bassett et al.

(10) Patent No.: US 10,528,026 B2
(45) Date of Patent: Jan. 7, 2020

(54) APPARATUS AND METHOD FOR ORIENTATION OF A PARTIALLY COATED SPHERE

(71) Applicant: DELPHI TECHNOLOGIES IP LIMITED, St. Michael (BB)

(72) Inventors: Ray Bassett, Webster, NY (US); Joseph F. LaFrance, Holley, NY (US); Thomas Rider, Leroy, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 75 days.

(21) Appl. No.: 15/446,533

(22) Filed: Mar. 1, 2017

(65) Prior Publication Data
US 2018/0253077 A1 Sep. 6, 2018

(51) Int. Cl.
*G05B 19/402* (2006.01)
*B23K 26/26* (2014.01)
(Continued)

(52) U.S. Cl.
CPC ............ *G05B 19/402* (2013.01); *B23K 26/26* (2013.01); *B23K 26/28* (2013.01); *B23K 26/32* (2013.01);
(Continued)

(58) Field of Classification Search
CPC ............ A63B 45/02; A63B 2071/0694; A63B 2220/05; A63B 2220/16; A63B 2220/807;
(Continued)

(56) References Cited

U.S. PATENT DOCUMENTS 4,657,475 A * 4/1987 Ohtsuji .................. A63B 45/00
198/394
5,036,544 A * 7/1991 Sakaue .................... G06K 9/48
382/197

(Continued)

FOREIGN PATENT DOCUMENTS

EP 2923792 A1 9/2015
KR 1020160019871 A 2/2016

OTHER PUBLICATIONS

Banavar et al., Orientation Feedback for a Spherical Robot Using a Single Camera, IEEE. (Year: 2016).*

*Primary Examiner* — Darrin D Dunn
(74) *Attorney, Agent, or Firm* — Joshua M. Haines

(57) ABSTRACT

An apparatus for orienting a partially coated spherical-object includes a pedestal, a camera, and a controller. The spherical object contains a coating over a portion of a surface. The coating defines a spherical-cap, and the spherical cap defines a polar-axis. The polar-axis is oriented normal to a plane defining a base of the spherical cap, wherein an intersection of the plane and the surface defines a boundary line. The pedestal retains the spherical object and selectively rotates the spherical object about a longitudinal axis of the pedestal. The camera captures an image of the spherical object on the pedestal. The controller is in communication with the pedestal and the camera. The controller is operable to control the rotation of the pedestal, detect the boundary line in the image, and determine when the pedestal has positioned the spherical object to cause the boundary line to have a zero curvature.

12 Claims, 6 Drawing Sheets

(51) Int. Cl.
  *B23K 26/28* (2014.01)
  *B23K 26/32* (2014.01)
  *F02M 61/16* (2006.01)
  *G01B 11/27* (2006.01)
  *H04N 7/18* (2006.01)
  *B23K 101/00* (2006.01)

(52) U.S. Cl.
  CPC ......... *F02M 61/168* (2013.01); *G01B 11/272* (2013.01); *H04N 7/183* (2013.01); *B23K 2101/006* (2018.08); *G05B 2219/45013* (2013.01); *G05B 2219/50359* (2013.01)

(58) Field of Classification Search
  CPC ... A63B 69/3658; G01B 11/24; G06F 3/0425; B05B 12/082; B05B 12/084; B05B 12/126; B05B 15/68
  See application file for complete search history.

(56) References Cited

U.S. PATENT DOCUMENTS

| | | | | |
|---|---|---|---|---|
| 5,223,793 A * | 6/1993 | Ricci | ............... | G01M 13/04 324/226 |
| 5,259,624 A * | 11/1993 | Puckett | ............. | A63B 37/0004 473/383 |
| 5,632,205 A * | 5/1997 | Gordon | ............... | B41F 17/30 101/483 |
| 6,226,416 B1 | 5/2001 | Ohshima | ............... | G06T 7/246 356/28 |
| 6,236,122 B1 * | 5/2001 | Maeda | ............... | H03K 17/063 307/125 |
| 6,348,743 B1 * | 2/2002 | Sakasai | ............... | H02P 9/04 290/40 A |
| 6,508,416 B1 | 1/2003 | Mastro et al. | | |
| 6,538,767 B1 * | 3/2003 | Over | ............... | B41J 3/4073 358/1.18 |
| 6,741,353 B1 * | 5/2004 | Johs | ............... | G01N 21/211 356/369 |
| 7,063,747 B2 * | 6/2006 | Lastowka | ............. | B05B 12/084 118/669 |
| 7,283,657 B1 * | 10/2007 | Carlson | ............... | A63B 45/02 382/100 |
| 7,340,344 B2 * | 3/2008 | Chappell | ............... | G01C 21/16 701/500 |
| 7,439,631 B2 * | 10/2008 | Endou | ............... | B60L 11/005 307/9.1 |
| 7,617,070 B2 * | 11/2009 | Kurth | ............... | G01C 21/025 702/150 |
| 7,899,576 B2 * | 3/2011 | Pentland | ............... | G09F 19/12 362/239 |
| 7,972,221 B2 * | 7/2011 | Furze | ............... | A63B 45/00 473/151 |
| 8,314,939 B2 * | 11/2012 | Kato | ............... | G01S 17/66 356/608 |
| 8,319,696 B2 * | 11/2012 | Clayton | ............... | H01Q 1/081 343/765 |
| 8,335,347 B2 * | 12/2012 | Grange | ............... | G01S 5/163 382/103 |
| 8,463,574 B2 * | 6/2013 | Schaafsma | ............... | B41M 1/40 702/150 |
| 9,536,163 B2 * | 1/2017 | Veeser | ............... | G01B 11/002 |
| 2003/0153396 A1 * | 8/2003 | Andresen | ............... | A63B 45/02 473/280 |
| 2003/0221615 A1 * | 12/2003 | Lastowka | ............. | B05B 12/084 118/679 |
| 2004/0239950 A1 * | 12/2004 | Mahon | ............... | G01B 11/24 356/606 |
| 2005/0172695 A1 * | 8/2005 | Furze | ............... | G01B 21/042 73/1.01 |
| 2006/0259180 A1 * | 11/2006 | Jahn | ............... | G06T 7/75 700/175 |
| 2006/0260147 A1 * | 11/2006 | Pelletier | ............... | G01B 21/042 33/520 |
| 2008/0284790 A1 * | 11/2008 | Protola | ............... | G01B 11/26 345/582 |
| 2009/0075744 A1 * | 3/2009 | Tuxen | ............... | A63B 24/0021 473/200 |
| 2009/0189917 A1 * | 7/2009 | Benko | ............... | G06F 3/14 345/647 |
| 2009/0238668 A1 * | 9/2009 | Grange | ............... | H01Q 1/125 414/433 |
| 2009/0281763 A1 * | 11/2009 | Schaafsma | ............... | B41M 1/40 702/150 |
| 2009/0285449 A1 * | 11/2009 | Grange | ............... | G01S 5/163 382/103 |
| 2012/0148099 A1 * | 6/2012 | Kim | ............... | G06T 7/246 382/103 |
| 2012/0165993 A1 * | 6/2012 | Whitehouse | ....... | G05D 23/1904 700/278 |
| 2014/0111630 A1 * | 4/2014 | Pires | ............... | A61B 3/113 348/78 |
| 2015/0260859 A1 * | 9/2015 | Christoph | ............... | G01B 15/04 378/207 |
| 2017/0203515 A1 * | 7/2017 | Bennett | ............... | B29C 67/0088 |

* cited by examiner

APPARATUS AND METHOD FOR ORIENTATION OF A PARTIALLY COATED SPHERE

TECHNICAL FIELD OF INVENTION

This disclosure generally relates to an apparatus for orienting a partially coated sphere, and more particularly relates to an apparatus for orienting a partially coated sphere used in the manufacturing of a fuel injector.

BACKGROUND OF INVENTION

It is known to apply coatings to critical wear surfaces of valve components in a fuel injector for the purpose of improving wear resistance and/or reducing friction. The valve-member elements of the typical fuel injector are small and require very tight tolerances to control the accurate flow of fuel. The application of wear resistant coatings to the valve-members presents challenges in the manufacturing process, especially where welding is involved, as the coatings may contaminate the weld. Orienting a partially-coated spherical valve-member typically requires multiple manipulations to achieve the desired orientation prior to welding, increasing manufacturing time and part handling. Assuring the rapid and accurate orientation of a partially-coated spherical-object valve-member is critical to the manufacturing of the fuel injector.

SUMMARY OF THE INVENTION

In accordance with one embodiment, an apparatus for orienting a partially coated spherical-object is provided. The apparatus includes a pedestal, a camera, and a controller. The spherical-object contains a coating over a portion of a surface. The coating defines a spherical-cap, and the spherical-cap defines a polar-axis. The polar-axis passes through both a center of the spherical-object and through an apex of the spherical-cap. The polar-axis is oriented normal to a plane defining a base of the spherical-cap, wherein an intersection of the plane and the surface defines a boundary-line. The pedestal retains the spherical-object and selectively rotates the spherical-object about a longitudinal-axis of the pedestal. The camera captures an image of the spherical-object on the pedestal. The controller is in communication with the pedestal and the camera. The controller is operable to control the rotation of the pedestal, detect the boundary-line in the image, and determine when the pedestal has positioned the spherical-object to cause the boundary line to have a zero-curvature.

In another embodiment, a method of orienting a partially coated spherical-object is provided. The method includes the steps of providing the spherical-object, retaining the spherical-object, rotating the spherical-object, capturing an image, controlling rotation, detecting a boundary-line, determining a zero-curvature, determining a polar-axis-angle, determining a height, determining a correlation-coefficient, transferring the spherical-object, and welding a tubular-core. The spherical-object contains a coating over a portion of a surface of the spherical-object. The coating defines a spherical-cap and the spherical-cap defines a polar-axis that passes through both a center of the spherical-object and an apex of the spherical-cap. The polar-axis is oriented normal to a plane defining a base of the spherical-cap, wherein an intersection of the plane and the surface defines a boundary-line. The step of retaining the spherical-object includes retaining the spherical-object on a pedestal. The step of rotating the spherical-object includes using the pedestal to rotate the spherical-object about a longitudinal-axis of the pedestal. The step of capturing an image includes capturing an image of the spherical-object on the pedestal using a camera. The step of controlling rotation includes using a controller to control the rotation of the pedestal. The step of detecting a boundary-line includes using a controller to detect the boundary-line in the image. The step of determining a zero-curvature includes using a controller to determine when the pedestal has positioned the spherical-object to cause the boundary-line to have a zero-curvature. The step of determining a polar-axis-angle includes using a controller to determine a polar-axis-angle relative to the longitudinal-axis of the pedestal. The step of determining a height includes using a controller to determine a height of the spherical-cap and further determining with the controller whether the height of the spherical-cap is within a predetermined range. The step of determining a correlation-coefficient includes using a controller to determine a correlation-coefficient of a linearity of the boundary-line and further determining with the controller whether the correlation-coefficient is within a predetermined range. The step of transferring the spherical-object includes placing with a transfer-device the spherical-object into a conical-fixture such that the polar-axis passes through a conical-fixture-apex and a hemisphere of the spherical-object containing the spherical-cap is positioned closest to the conical-fixture-apex. The step of welding a tubular-core includes welding the tubular-core to the spherical-object.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
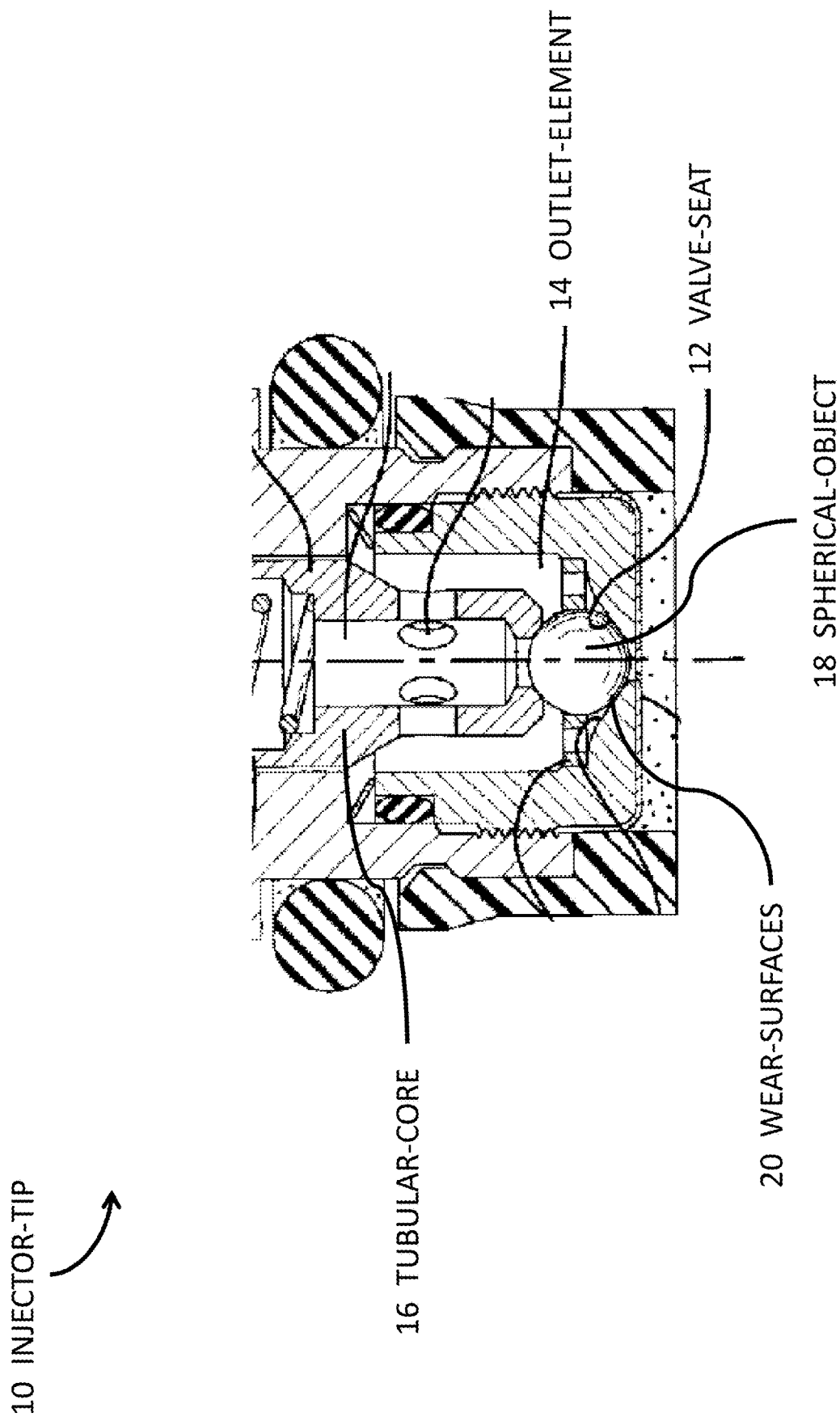
FIG. 1 is an illustration of an fuel injector-tip which includes a partially coated spherical-object which may be oriented by the apparatus and method in accordance with the present application.

FIG. 1 illustrates a non-limiting example of an injector-tip 10, of a fuel injector used to inject fuel into an internal combustion engine. The injector-tip 10 includes a valve-seat 12 and an outlet-element 14 that are used to control the flow of fuel, as will be recognized by one skilled in the art. The outlet-element 14 includes a tubular-core 16 attached to a spherical-object 18. The spherical-object 18 contacts the valve-seat 12 creating wear-surfaces 20. A coating 22 (FIG. 2) may be applied to the valve-seat 12 and the spherical-object 18 to improve the wear resistance of both the valve-seat 12 and the spherical-object 18.

Figure 2:
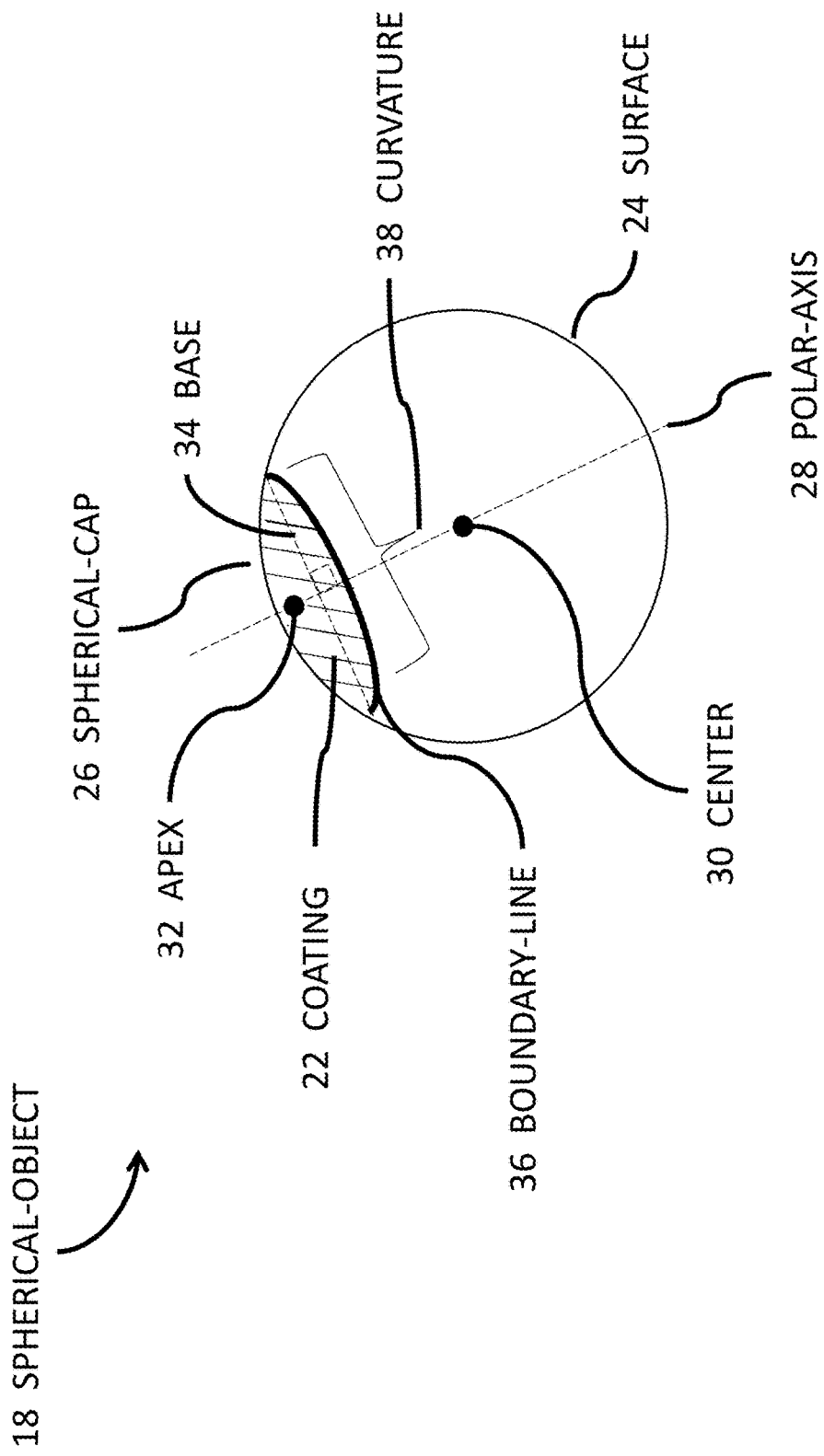
FIG. 2 is an illustration of a partially coated spherical-object which may be oriented by the apparatus and method in accordance with the present application

FIG. 2 illustrates the spherical-object 18 that is a component of the outlet-element 14 of FIG. 1. The spherical-object 18 may include the coating 22 over a portion of a surface 24 of the spherical-object 18, which may be any of the known coatings 22 used to reduce wear, including, but not limited to a diamond-like carbon (DLC) and/or a carbide-forming material including material selected from the list of titanium, tungsten, and silicon. The coating 22 may be applied to the spherical-object 18 prior to attaching the spherical-object 18 to the tubular-core 16 by any of the known deposition processes including, but not limited to, chemical vapor deposition and/or physical vapor deposition.

As illustrated in FIG. 2, the coating 22 defines a spherical-cap 26 and the spherical-cap 26 defines a polar-axis 28 that passes through both a center 30 of the spherical-object 18 and an apex 32 of the spherical-cap 26. The polar-axis 28 is oriented normal to a plane defining a base 34 of the spherical-cap 26, wherein an intersection of the plane and the surface 24 defines a boundary-line 36. The boundary-line 36 is characterized by a curvature 38 that varies depending on a point-of-view, as will be understood by one skilled in the art of geometry.

Figure 3:
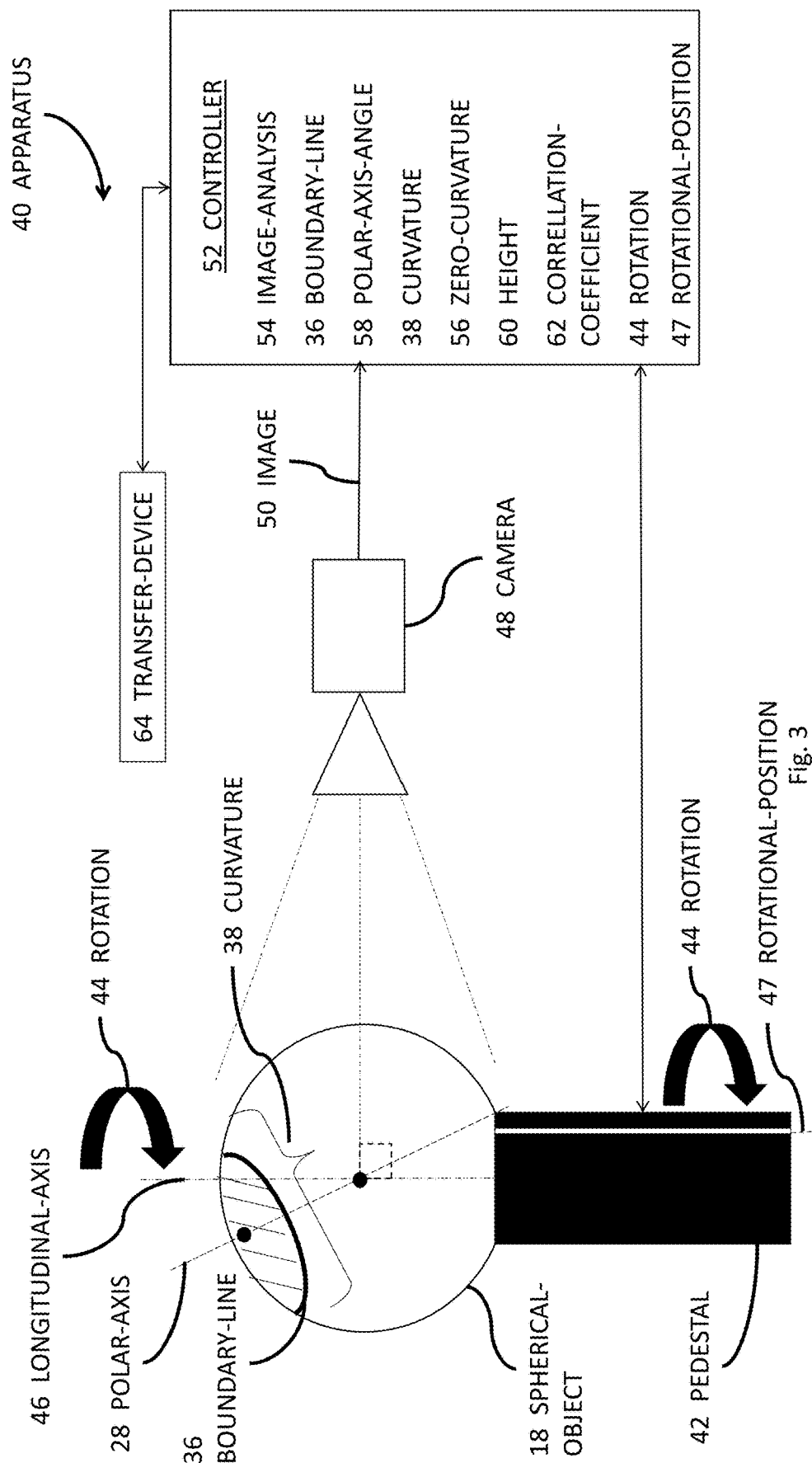
FIG. 3 is an illustration of an apparatus in accordance with the present application for orienting the spherical-object of FIG. 2 in accordance with one embodiment.

FIG. 3 illustrates an apparatus 40 for orienting the partially coated spherical-object 18 for attachment to the tubular-core 16 at a future operation. The spherical-object 18 may be attached to the tubular-core 16 by any of the known welding processes, including, but not limited to, laser-welding. As will be understood by one skilled in the art, the polar-axis 28 of the partially coated spherical-object 18 may align with a tubular-core-longitudinal-axis (not shown) in order for the wear-surfaces 20 with the coating 22 to be correctly aligned (FIG. 1) in the injector-tip 10. In addition, the spherical-cap 26 may be oriented such that the tubular-core may be joined at a location on the surface 24 that is 180° opposed to the apex 32 of the spherical-cap 26.

The apparatus 40 includes a pedestal 42 which retains the spherical-object 18 and selectively rotates 44 the spherical-object 18 about a longitudinal-axis 46 of the pedestal 42. The pedestal 42 may include a motor (not shown) to create the rotation 44, or may be rotated 44 by a mechanical-linkage to a remote-motor. The pedestal 42 may also include an encoding-device (not shown) that enables a tracking of the rotational-position 47 (FIG. 3) of the pedestal 42. The pedestal 42 may retain the spherical-object 18 by any of the known retention methods, including, but not limited to magnetism and/or a vacuum.

The apparatus 40 also includes a camera 48 that captures an image 50 of the spherical-object 18 on the pedestal 42. The camera 48 is shown with a point-of-view from a side of the pedestal 42 for illustration purposes only. The camera 48 is preferably mounted such that the point-of-view is facing into the page of FIG. 3 (as is the point-of-view of the reader), with a line-of-sight (not specifically shown) of the camera 48 passing through the center 30 of the spherical-object 18 and perpendicular to the longitudinal-axis 46 of the pedestal 42. Other mounting configurations of the camera 48 may be used and may be compensated by a calibration of the camera 48. The camera 48 may be any camera 48 capable of generating the image 50, and preferably a video-type camera 48, such as the In-Sight 5000 from Cognex Corporation located in Natick, Mass., USA.

The apparatus 40 also includes a controller 52 in communication with the pedestal 42 and the camera 48. The controller 52 may be any of the known machine controllers 52 capable of interfacing with the camera 48 and various actuators, such as the pedestal 42. The controller 52 may include a processor (not specifically shown) such as a microprocessor or other control circuitry such as analog and/or digital control circuitry including an application specific integrated circuit (ASIC) for processing data as should be evident to those in the art. The controller 52 may include a memory (not shown), including non-volatile memory, such as electrically erasable programmable read-only memory (EEPROM) for storing one or more routines, thresholds, and captured data. The one or more routines may be executed by the processor to perform steps for detecting the coating 22 and determining the alignment of the spherical-object 18 based on signals received by the controller 52 from the camera 48 and the pedestal 42 as described herein.

The controller 52 is operable to control the rotation 44 of the pedestal 42 and detect the boundary-line 36 in the image 50 using an image-analysis 54 routine. The image-analysis 54 routine may be any of the known image-analysis 54 routines, such as those included in the In-Sight Explorer Software from Cognex Corporation located in Natick, Mass., USA.

Figure 4:
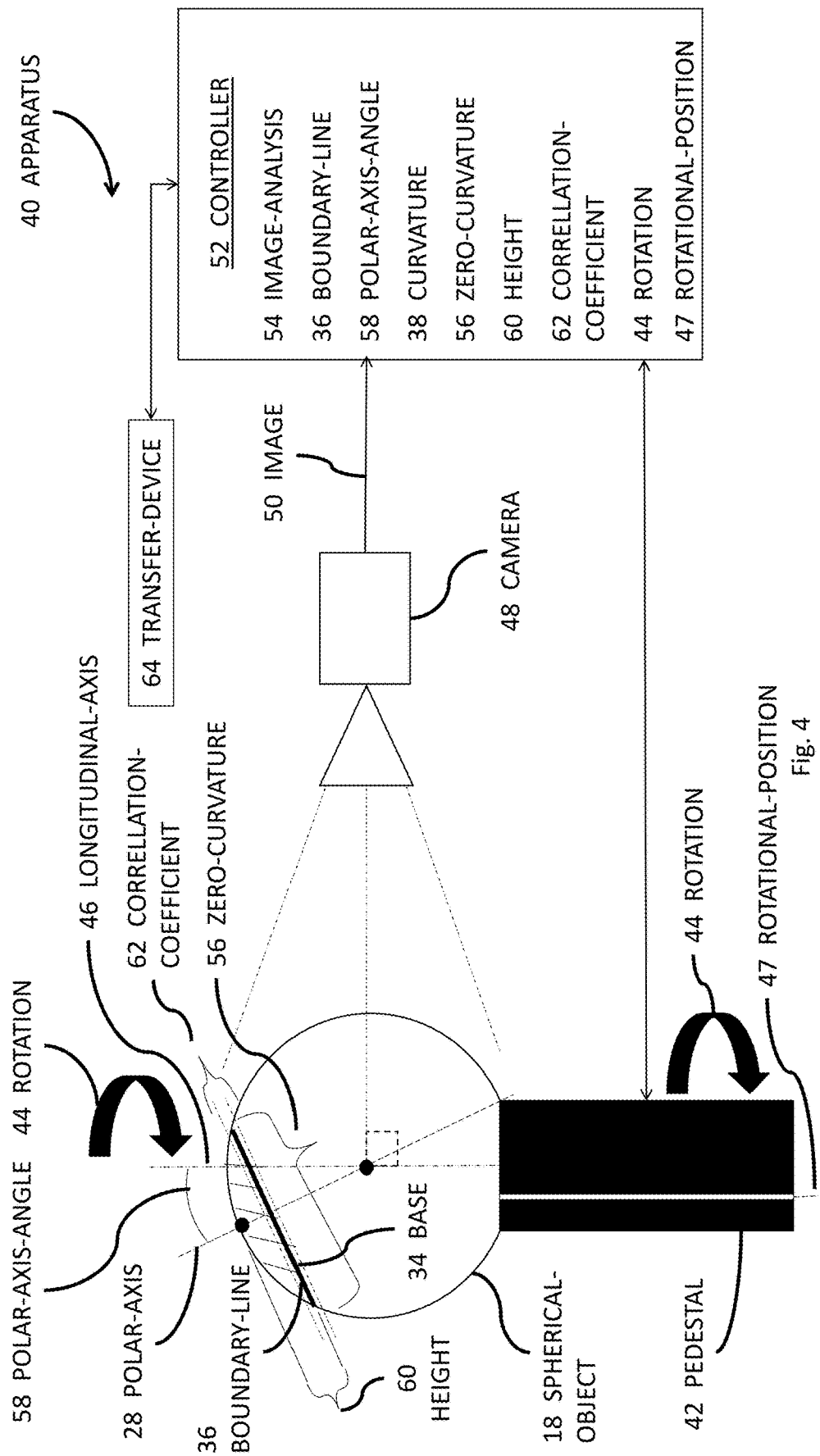
FIG. 4 is an illustration of the apparatus of FIG. 3 in accordance with the present invention.

The controller 52 may further perform the image-analysis 54 routine to determine when the pedestal 42 has positioned the spherical-object 18 to cause the boundary-line 36 detected in the image 50 to have a zero-curvature 56, as illustrated in FIG. 4. The zero-curvature 56 of the boundary-line 36 is a phenomenon of the geometry of the spherical-object 18 and the spherical-cap 26, and is defined as a straight-line. The boundary-line 36 will have two rotational-positions 47 where the zero-curvature 56 is detected, with each of the two rotational-positions 47 opposed to one another by 180° of the pedestal 42 rotation 44. The controller 52 may identify each of the two rotational-positions 47 and store them in the memory to assist in a future transfer process, as will be described below. Once the position of the zero-curvature 56 is determined, the controller may determine a polar-axis-angle 58 which is defined as the angle between the polar-axis 28 of the spherical-object 18 and the longitudinal-axis 46 of the pedestal (FIG. 4). The controller may also store the polar-axis-angle 58 in the memory with the associated position of zero-curvature 56 to assist in the future transfer process, as will be described below. It will also be understood that the polar-axis-angle 58 will have two angles where the zero-curvature 56 is detected.

The controller 52 may also determine a height 60 of the spherical-cap 26, which is defined as a distance from the base 34 to the apex 32. The height 60 may be used to determine whether a coverage of the surface 24 with the coating 22 meets a user-defined specification. The height 60 of the spherical-cap 26 should be sufficient to cover the wear-surfaces 20 when assembled into the injector-tip 10, yet not so great as to interfere with the welding operation of the tubular-core 16.

The controller 52 may also determine a correlation-coefficient 62 of a linearity of the boundary-line 36 and further determine whether the correlation-coefficient 62 is within a predetermined range. The correlation-coefficient 62 is an estimate of how closely detected points that make up the boundary-line 36 approximate a straight line using a least-squares fitting. A correlation-coefficient 62 of 1.0 is indicative of a perfect correlation, i.e. all the points lie exactly on a straight line, where smaller values of the correlation-coefficient 62 indicate greater scatter, and therefore, a less defined boundary-line 36. Also, the sign of the correlation-coefficient 62 (either positive or negative) is indicative of the slope of the correlation-coefficient 62. The acceptable limit of the correlation-coefficient 62 is user-defined and may be set to values less than 1.0, and would preferably be greater than 0.9. Spherical-objects 18 with the correlation-coefficient 62 less than the user-defined limit may be excluded from further processing. Other known methods of curve-fitting are contemplated, but not disclosed, including, but not limited to a Chi Square, as will be recognized by those skilled in the art of statistical methods.

Figure 5:
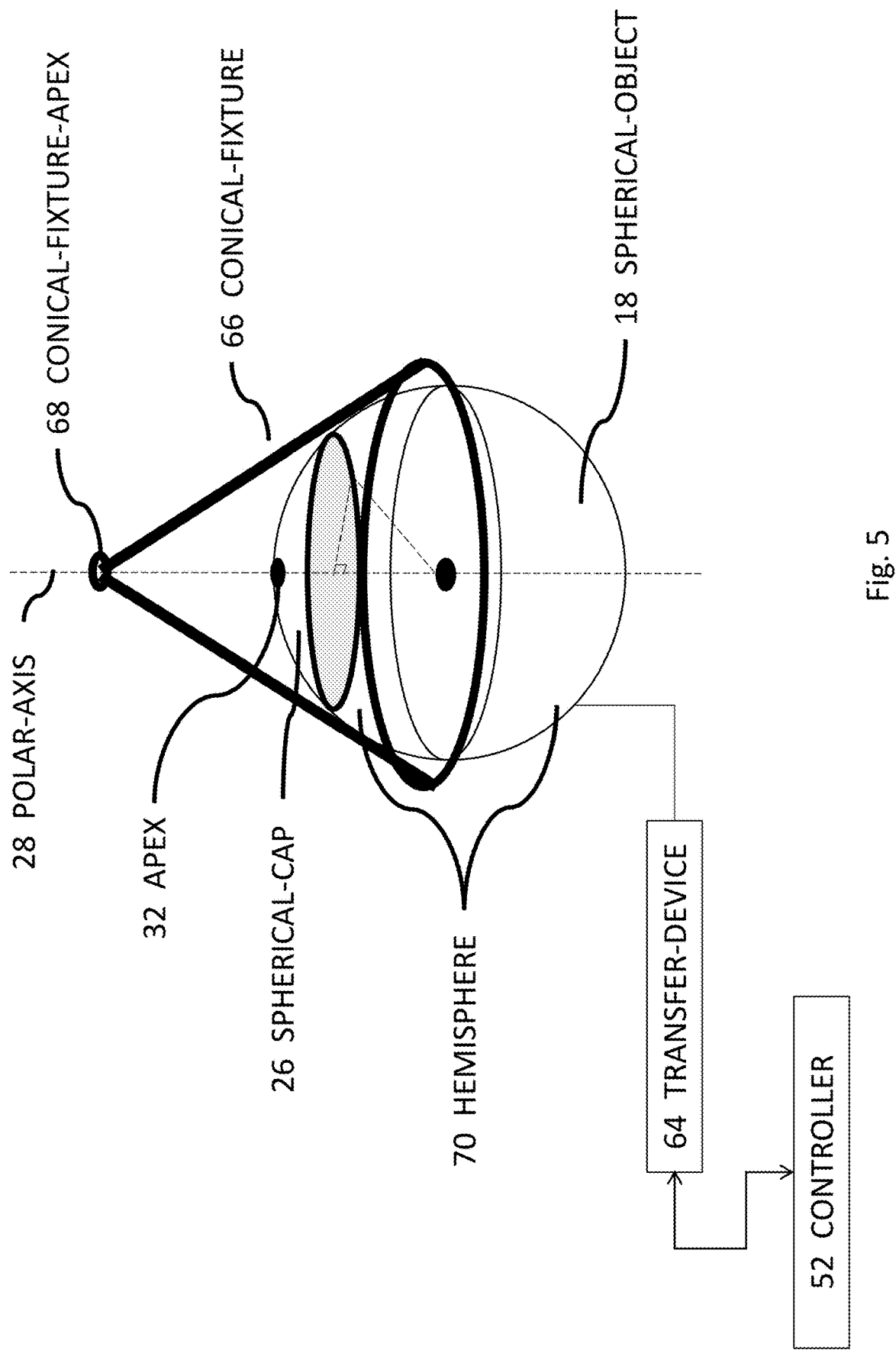
FIG. 5 is an illustration of a conical-fixture of the apparatus in accordance with the present invention.

The apparatus 40 may also include a transfer-device 64 (FIG. 4) which places the spherical-object 18 into a conical-fixture 66 (FIG. 5) to enable the welding of the tubular-core 16 to the spherical-object 18. The controller 52 controls the transfer-device 64, based on the polar-axis-angle 58, to select a pick-point (not shown) on the surface 24 of the spherical-object 18 with which to hold the spherical-object 18 for transfer to the conical-fixture 66. As illustrated in FIG. 5, the transfer-device 64 places the spherical-object 18 into the conical-fixture 66 such that the polar-axis 28 passes through a conical-fixture-apex 68, and a hemisphere 70 of the spherical-object 18 containing the spherical-cap 26 is positioned closest to the conical-fixture-apex 68. The transfer-device 64 may also place the spherical-object 18 into the conical-fixture 66 such that the polar-axis 28 of the partially coated spherical-object 18 may align with the tubular-core-longitudinal-axis (not shown) in order for the wear-surfaces 20 to be correctly aligned (FIG. 1) in the injector-tip 10 after welding. In addition, the spherical-cap 26 may be oriented such that the tubular-core may be joined at a location on the surface 24 that is preferably 180° opposed to the apex 32 of the spherical-cap 26. The transfer-device 64 may be any known transfer-device 64 suitable for handling the spherical-object 18, and may include a robotic-gripper (not-shown), a vacuum-device (not shown), and a magnetic-device (not shown). The conical-fixture 66 may retain the spherical-object by any of the known means, including, but not limited to, vacuum and magnetism.

Figure 6:
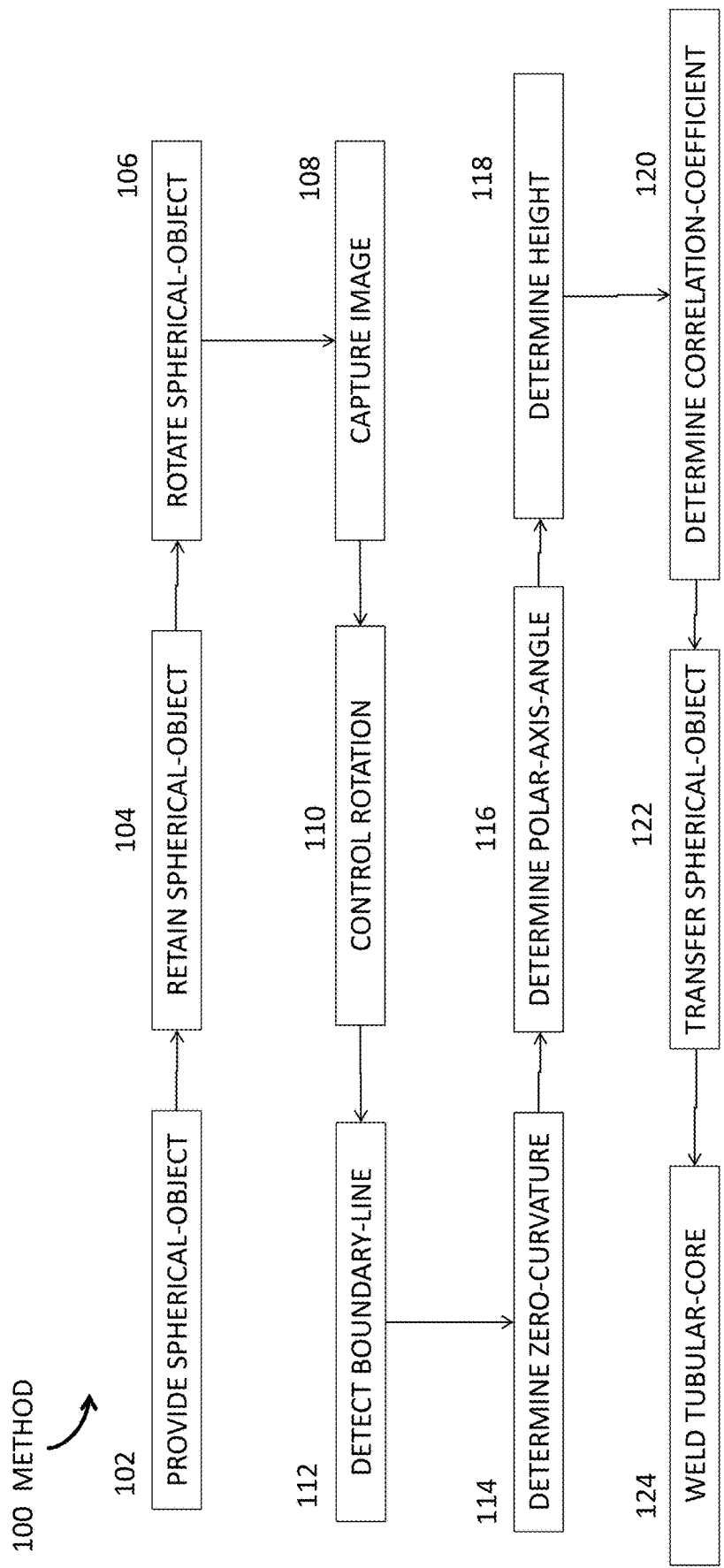
FIG. 6 is flow chart illustrating a method of orienting a partially coated spherical-object in accordance with the present invention.

FIG. 6 is a flow chart that illustrates a method 100 of orientating a partially coated spherical-object 18.

Step 102, PROVIDE SPHERICAL-OBJECT, may include providing a spherical-object 18 containing a coating 22 over a portion of a surface 24 of the spherical-object 18.

FIG. 1 illustrates a non-limiting example of an injector-tip 10, of a fuel injector used to inject fuel into an internal combustion engine. The injector-tip 10 includes a valve-seat 12 and an outlet-element 14 that are used to control the flow of fuel, as will be recognized by one skilled in the art. The outlet-element 14 includes a tubular-core 16 attached to the spherical-object 18. The spherical-object 18 contacts the valve-seat 12 creating wear-surfaces 20. The coating 22 (FIG. 2) may be applied to the valve-seat 12 and the spherical-object 18 to improve the wear resistance of both the valve-seat 12 and the spherical-object 18.

FIG. 2 illustrates the spherical-object 18 that is a component of the outlet-element 14 of FIG. 1. The spherical-object 18 may include the coating 22 over a portion of a surface 24 of the spherical-object 18, which may be any of the known coatings 22 used to reduce wear, including, but not limited to a diamond-like carbon (DLC) and/or a carbide-forming material including material selected from the list of titanium, tungsten, and silicon. The coating 22 may be applied to the spherical-object 18 prior to attaching the spherical-object 18 to the tubular-core 16 by any of the known deposition processes including, but not limited to, chemical vapor deposition and/or physical vapor deposition.

As illustrated in FIG. 2, the coating 22 defines a spherical-cap 26 and the spherical-cap 26 defines a polar-axis 28 that passes through both a center 30 of the spherical-object 18 and an apex 32 of the spherical-cap 26. The polar-axis 28 is oriented normal to a plane defining a base 34 of the spherical-cap 26, wherein an intersection of the plane and the surface 24 defines a boundary-line 36. The boundary-line 36 is characterized by a curvature 38 that varies depending on a point-of-view, as will be understood by one skilled in the art of geometry.

Step 104, RETAIN SPHERICAL-OBJECT, may include retaining the spherical-object 18 on a pedestal 42. An apparatus 40 illustrated in FIG. 3 includes the pedestal 42 which retains the spherical-object 18. The pedestal 42 may retain the spherical-object 18 by any of the known retention methods, including, but not limited to magnetism and/or a vacuum.

Step 106, ROTATE SPHERICAL-OBJECT, may include using the pedestal 42 to rotate 44 the spherical-object 18 about a longitudinal-axis 46 of the pedestal 42. The apparatus 40 illustrated in FIG. 3 includes the pedestal 42 which retains the spherical-object 18 and selectively rotates 44 the spherical-object 18 about the longitudinal-axis 46 of the pedestal 42. The pedestal 42 may include a motor (not shown) to create the rotation 44, or may be rotated 44 by a mechanical-linkage to a remote-motor. The pedestal 42 may also include an encoding-device (not shown) that enables a tracking of the rotational-position 47 of the pedestal 42.

Step 108, CAPTURE IMAGE, may include capturing an image 50 of the spherical-object 18 on the pedestal 42 using a camera 48. The apparatus 40 also includes the camera 48 that captures the image 50 of the spherical-object 18 on the pedestal 42. The camera 48 is shown with a point-of-view from a side of the pedestal 42 for illustration purposes only. The camera 48 is preferably mounted such that the point-of-view is facing into the page of FIG. 3 (as is the point-of-view of the reader), with a line-of-sight (not specifically shown) of the camera 48 passing through the center 30 of the spherical-object 18 and perpendicular to the longitudinal-axis 46 of the pedestal 42. Other mounting configurations of the camera 48 may be used and may be compensated by a calibration of the camera 48. The camera 48 may be any camera 48 capable of generating the image 50, and preferably a video-type camera 48, such as the In-Sight 5000 from Cognex Corporation located in Natick, Mass., USA.

Step 110, CONTROL ROTATION, may include using a controller 52 to control the rotation 44 of the pedestal 42. The apparatus 40 also includes the controller 52 in communication with the pedestal 42 and the camera 48. The controller 52 may be any of the known machine controllers 52 capable of interfacing with the camera 48 and various actuators such as the pedestal 42. The controller 52 may include a processor (not specifically shown) such as a microprocessor or other control circuitry such as analog and/or digital control circuitry including an application specific integrated circuit (ASIC) for processing data as should be evident to those in the art. The controller 52 may include a memory (not shown), including non-volatile memory, such as electrically erasable programmable read-only memory (EEPROM) for storing one or more routines, thresholds, and captured data. The one or more routines may be executed by the processor to perform steps for detecting the coating 22 and determining the alignment of the spherical-object 18 based on signals received by the controller 52 from the camera 48 and the pedestal 42 as described herein.

Step 112, DETECT BOUNDARY-LINE, may include using the controller 52 to detect the boundary-line 36 in the image 50. The controller 52 is operable to control the rotation 44 of the pedestal 42 and detect the boundary-line 36 in the image 50 using an image-analysis 54 routine. The image-analysis 54 routine may be any of the known image-analysis 54 routines, such as those included in the In-Sight Explorer Software from Cognex Corporation located in Natick, Mass., USA.

Step 114, DETERMINE ZERO-CURVATURE, may include using the controller 52 to determine when the pedestal 42 has positioned the spherical-object 18 to cause the boundary-line 36 to have a zero-curvature 56. The controller 52 may further perform the image-analysis 54 routine to determine when the pedestal 42 has positioned the spherical-object 18 to cause the boundary-line 36 detected in the image 50 to have zero-curvature 56, as illustrated in FIG. 4. The zero-curvature 56 of the boundary-line 36 is a phenomenon of the geometry of the spherical-object 18 and the spherical-cap 26, and is defined as a straight-line. The boundary-line 36 will have two rotational-positions 47 where the zero-curvature 56 is detected, with each of the two rotational-positions 47 opposed to one another by 180° of the pedestal 42 rotation 44. The controller 52 may identify each of the two rotational-positions 47 and store them in the memory to assist in a future transfer process, as will be described below.

Step 116, DETERMINE POLAR-AXIS-ANGLE, may include using the controller 52 to determine a polar-axis-angle 58 relative to the longitudinal-axis 46 of the pedestal 42. Once the position of the zero-curvature 56 is determined, the controller may determine the polar-axis-angle 58 which is defined as the angle between the polar-axis 28 of the spherical-object 18 and the longitudinal-axis 46 of the pedestal 42 (FIG. 4). The controller 52 may also store the polar-axis-angle 58 in the memory with the associated position of zero-curvature 56 to assist in the future transfer process, as will be described below. It will also be understood that the polar-axis-angle 58 will have two angles where the zero-curvature 56 is detected.

Step 118, DETERMINE HEIGHT, may include using the controller 52 to determine a height 60 of the spherical-cap 26. The controller 52 may also determine the height 60 of the spherical-cap 26, which is defined as a distance from the base 34 to the apex 32. The controller 52 may further determine whether the height 60 of the spherical-cap 26 is within a predetermined range. The height 60 may be used to determine whether a coverage of the surface 24 with the coating 22 meets a user-defined specification. The height 60 of the spherical-cap 26 should be sufficient to cover the wear-surface 20 when assembled into the injector-tip 10, yet not so great as to interfere with the welding operation of the tubular-core 16.

Step 120, DETERMINE CORRELATION-COEFFICIENT, may include using the controller 52 to determine a correlation-coefficient 62 of a linearity of the boundary-line 36. The controller 52 may also determine the correlation-coefficient 62 of the linearity of the boundary-line 36 and further determine whether the correlation-coefficient 62 is within a predetermined range. The correlation-coefficient 62 is an estimate of how closely the detected points that make up the boundary-line 36 approximate a straight line using a least-squares fitting. A correlation-coefficient 62 of 1.0 is indicative of a perfect correlation, i.e. all the points lie exactly on a straight line, where smaller values of the correlation-coefficient 62 indicate greater scatter, and therefore, a less defined boundary-line 36. Also, the sign of the correlation-coefficient 62 (either positive or negative) is indicative of the slope of the correlation-coefficient 62. The acceptable limit of the correlation-coefficient 62 is user-defined and may be set to values less than 1.0, and would preferably be greater than 0.9. Spherical-objects 18 with the correlation-coefficient 62 less than the user-defined limit may be excluded from further processing. Other known methods of curve-fitting are contemplated, but not disclosed, including, but not limited to a Chi Square, as will be recognized by those skilled in the art of statistical methods.

Step 122, TRANSFER SPHERICAL-OBJECT, may include placing with a transfer-device 64 the spherical-object 18 into a conical-fixture 66. The apparatus 40 may also include the transfer-device 64 (FIG. 4) which places the spherical-object 18 into the conical-fixture 66 (FIG. 5) to enable the welding of the tubular-core 16 to the spherical-object 18. The controller 52 controls the transfer-device 64, based on the polar-axis-angle 58, to select a pick-point (not shown) on the surface 24 of the spherical-object 18 with which to hold the spherical-object 18 for transfer to the conical-fixture 66. As illustrated in FIG. 5, the transfer-device 64 places the spherical-object 18 into the conical-fixture 66 such that the polar-axis 28 passes through a conical-fixture-apex 68, and a hemisphere 70 of the spherical-object 18 containing the spherical-cap 26 is positioned closest to the conical-fixture-apex 68. The transfer-device 64 may also place the spherical-object 18 into the conical-fixture 66 such that the polar-axis 28 of the partially coated spherical-object 18 may align with the tubular-core-longitudinal-axis (not shown) in order for the wear-surfaces 20 to be correctly aligned (FIG. 1) in the injector-tip 10 after welding. In addition, the spherical-cap 26 may be oriented such that the tubular-core 16 may be joined at a location on the surface 24 that is preferably 180° opposed to the apex 32 of the spherical-cap 26. The transfer-device 64 may be any known transfer-device 64 suitable for handling the spherical-object 18, and may include a robotic-gripper (not-shown), a vacuum-device (not shown), and a magnetic-device (not shown). The conical-fixture 66 may retain the spherical-object 18 by any of the known means, including, but not limited to, vacuum and magnetism.

Step 124, WELD TUBULAR-CORE, may include welding the tubular-core 16 to the spherical-object 18. The spherical-object 18 may be attached to the tubular-core 16 by any of the known welding processes, including, but not limited to, laser-welding. As will be understood by one skilled in the art, the polar-axis 28 of the partially coated spherical-object 18 may align with a tubular-core-longitudinal-axis (not shown) in order for the wear-surfaces 20 with the coating 22 to be correctly aligned (FIG. 1) in the injector-tip 10 after welding. In addition, the spherical-cap 26 may be oriented such that the tubular-core 16 may be joined at a location on the surface 24 that is preferably 180° opposed to the apex 32 of the spherical-cap 26.

Accordingly, an apparatus 40, a controller 52 for the apparatus 40 and a method 100 of orientating a partially coated spherical-object 18 is provided. The apparatus 40 and method 100 are beneficial because they assure the proper orientation of a partially-coated spherical valve-member which is critical to the manufacturing of the fuel injector.

While this invention has been described in terms of the preferred embodiments thereof, it is not intended to be so limited, but rather only to the extent set forth in the claims that follow.

We claim:

1. An apparatus for orienting a partially coated spherical-object, containing a coating over a portion of a surface of the spherical-object, wherein the coating defines a spherical-cap such that the spherical-cap is a region of the spherical-object which lies above a plane and such that the spherical-cap includes a base defined by the plane, and wherein the spherical-cap defines a polar-axis passing through both a center of the spherical-object and through an apex of the spherical-cap, said polar-axis oriented normal to the plane, wherein an intersection of the plane and the surface defines a boundary-line, comprising:
  a pedestal which retains the spherical-object and selectively rotates the spherical-object about a longitudinal-axis of the pedestal;
  a camera that captures an image of the spherical-object on the pedestal; and
  a controller in communication with the pedestal and the camera, said controller operable to control the rotation of the pedestal, detect the boundary-line in the image, and determine when the pedestal has positioned the spherical-object to cause the boundary-line to have a zero-curvature, the boundary-line being at the base of the spherical-cap which is the region of the spherical-object which lies above the plane;
  wherein the controller is also operable to determine a correlation-coefficient of a linearity of the boundary-line based on the image from the camera.

2. The apparatus in accordance with claim 1, wherein the controller is also operable to determine a polar-axis-angle relative to the longitudinal-axis of the pedestal based on a rotational-position of the pedestal.

3. The apparatus in accordance with claim 2, further comprising a transfer-device which places the spherical-object into a conical-fixture such that the polar-axis passes through a conical-fixture-apex and a hemisphere of the spherical-object containing the spherical-cap is positioned closest to the conical-fixture-apex.

4. The apparatus in accordance with claim 1, wherein the controller is also operable to determine a height of the spherical-cap based on the image from the camera.

5. The apparatus in accordance with claim 4, wherein the controller is also operable to determine whether the height of the spherical-cap is within a predetermined range based on the image from the camera.

6. The apparatus in accordance with claim 1, wherein the controller is also operable to determine whether the correlation-coefficient is within a predetermined range based on the image from the camera.

7. A method of orientating a partially coated spherical-object, said method comprising:
  providing a spherical-object containing a coating over a portion of a surface of the spherical-object, wherein the coating defines a spherical-cap such that the spherical-cap is a region of the spherical-object which lies above a plane and such that the spherical-cap includes a base defined by the plane, and wherein the spherical-cap defines a polar-axis passing through both a center of the spherical-object and through an apex of the spherical-cap, said polar-axis oriented normal to the plane, wherein an intersection of the plane and the surface defines a boundary-line;
  retaining the spherical-object on a pedestal;
  using the pedestal to rotate the spherical-object about a longitudinal-axis of the pedestal;
  capturing an image of the spherical-object on the pedestal using a camera;
  using a controller to control the rotation of the pedestal, detect the boundary-line in the image, and determine when the pedestal has positioned the spherical-object to cause the boundary-line to have a zero-curvature, the boundary-line being at the base of the spherical-cap which is the region of the spherical-object which lies above the plane; and
  determining with the controller a correlation-coefficient of a linearity of the boundary-line.

8. The method in accordance with claim 7, further comprising determining with the controller a polar-axis-angle relative to the longitudinal-axis of the pedestal.

9. The method in accordance with claim 8, further comprising placing with a transfer-device the spherical-object into a conical-fixture such that the polar-axis passes through a conical-fixture-apex and a hemisphere of the spherical-object containing the spherical-cap is positioned closest to the conical-fixture-apex.

10. The method in accordance with claim 7, further comprising determining with the controller a height of the spherical-cap.

11. The method in accordance with claim 10, further comprising determining with the controller whether the height of the spherical-cap is within a predetermined range.

12. The method in accordance with claim 7, further comprising determining with the controller whether the correlation-coefficient is within a predetermined range.

* * * * *